(12) United States Patent
Laskowski et al.

(10) Patent No.: US 11,505,021 B2
(45) Date of Patent: Nov. 22, 2022

(54) MULTI-TIERED BODY FRAME INTEGRAL STRUCTURE FOR OFF ROAD VEHICLES

(71) Applicant: GM GLOBAL TECHNOLOGY OPERATIONS LLC, Detroit, MI (US)

(72) Inventors: Trevor Laskowski, Livonia, MI (US); Matthew B. Rombach, Davisburg, MI (US); Michael T. Chaney, Macomb, MI (US); Robert N. Saje, Shelby Township, MI (US); Warren J. Parsons, Oakland, MI (US); Anthony R. Rossello, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 17/165,991

(22) Filed: Feb. 3, 2021

(65) Prior Publication Data

US 2022/0242183 A1  Aug. 4, 2022

(51) Int. Cl.
*B60G 3/20* (2006.01)
*B62D 25/08* (2006.01)
*B62D 21/11* (2006.01)

(52) U.S. Cl.
CPC ............... *B60G 3/20* (2013.01); *B62D 21/11* (2013.01); *B62D 25/088* (2013.01); *B60G 2204/4302* (2013.01)

(58) Field of Classification Search
CPC ........ B62D 25/088; B62D 21/11; B60G 3/20; B60G 2204/4302
See application file for complete search history.

(56) References Cited

U.S. PATENT DOCUMENTS

| | | | | |
|---|---|---|---|---|
| 5,169,171 A | * | 12/1992 | Ban ...................... | B60G 13/001 280/86.753 |
| 5,346,276 A | * | 9/1994 | Enning ................ | B62D 25/088 296/203.02 |
| 5,536,035 A | * | 7/1996 | Bautz ...................... | B60G 7/02 280/124.147 |
| 5,915,727 A | * | 6/1999 | Bonnville ................ | B60G 7/02 280/124.1 |
| 6,047,988 A | * | 4/2000 | Aloe ........................ | B60G 7/02 280/788 |
| 6,109,629 A | * | 8/2000 | Bortz ..................... | B62D 21/11 280/124.109 |
| 6,516,914 B1 | * | 2/2003 | Andersen ............. | B60K 7/0007 280/124.179 |
| 6,520,494 B1 | * | 2/2003 | Andersen ................. | B60G 7/00 267/273 |

(Continued)

*Primary Examiner* — Paul N Dickson
*Assistant Examiner* — Timothy Wilhelm
(74) *Attorney, Agent, or Firm* — Vivacqua Crane PLLC

(57) ABSTRACT

A structural load path assembly includes an upper rail configured to be coupled to a suspension system, a lower rail spaced apart from the upper rail along a vertical direction, a first outer bracket interconnecting the upper rail and the lower rail, a second outer bracket interconnecting the upper rail and the lower rail, a first inner bracket interconnecting the upper rail and the lower rail, wherein the first inner bracket is spaced apart from the first outer bracket along a horizontal direction, and the horizontal direction is perpendicular to the vertical direction, a second inner bracket interconnecting the upper rail and the lower, and a box section sized to receive a shock absorber.

10 Claims, 8 Drawing Sheets

(56) References Cited

U.S. PATENT DOCUMENTS

| | | | | |
|---|---|---|---|---|
| 7,147,275 B2* | 12/2006 | Matsuyama | B62D 25/082 | 296/203.02 |
| 8,448,966 B2* | 5/2013 | Rawlinson | B62D 25/088 | 280/124.147 |
| 8,561,735 B2* | 10/2013 | Morrow | B60K 6/46 | 180/65.6 |
| 8,579,308 B2* | 11/2013 | Weeks | B60G 3/20 | 280/124.109 |
| 9,233,719 B2* | 1/2016 | Shibata | B62D 25/082 | |
| 9,260,134 B2* | 2/2016 | Asano | B62D 21/152 | |
| 9,278,714 B2* | 3/2016 | Amemiya | B62D 25/088 | |
| 9,321,374 B2* | 4/2016 | Oya | B60N 2/062 | |
| 9,352,785 B2* | 5/2016 | Winberg | B62D 21/11 | |
| 9,533,711 B2* | 1/2017 | Hirsch | B60G 3/20 | |
| 9,567,009 B2* | 2/2017 | Asano | B60G 3/20 | |
| 9,649,923 B2* | 5/2017 | Perlo | B60K 1/04 | |
| 9,725,122 B2* | 8/2017 | Kim | B62D 25/082 | |
| 9,731,766 B2* | 8/2017 | Kim | B62D 25/08 | |
| 9,855,973 B2* | 1/2018 | Rioult | B62D 25/088 | |
| 9,855,975 B2* | 1/2018 | Amemiya | B62D 21/00 | |
| 9,878,743 B2* | 1/2018 | Maruyama | B62D 25/088 | |
| 9,950,603 B2* | 4/2018 | Abe | B62D 21/15 | |
| 9,956,992 B1* | 5/2018 | Iimi | B62D 25/08 | |
| 9,988,091 B2* | 6/2018 | McConnell | B62D 21/155 | |
| 10,071,768 B2* | 9/2018 | Yasuhara | B60K 6/20 | |
| 10,336,376 B2* | 7/2019 | Maruyama | B62D 21/11 | |
| 10,981,603 B2* | 4/2021 | Matsuoka | B62D 25/082 | |
| 11,008,043 B2* | 5/2021 | Iimi | B62D 21/02 | |
| 11,110,977 B2* | 9/2021 | Smith | B60K 17/348 | |
| 11,345,404 B2* | 5/2022 | Tashiro | B62D 25/08 | |
| 2017/0008569 A1* | 1/2017 | Hofmann | B62D 25/088 | |
| 2019/0092394 A1* | 3/2019 | Masuda | B62D 25/2027 | |
| 2021/0114666 A1* | 4/2021 | Tashiro | B62D 21/152 | |
| 2021/0237800 A1* | 8/2021 | Kirita | B62D 21/02 | |
| 2022/0161854 A1* | 5/2022 | Mortenson | B62D 21/09 | |

\* cited by examiner

MULTI-TIERED BODY FRAME INTEGRAL STRUCTURE FOR OFF ROAD VEHICLES

INTRODUCTION

The present disclosure generally relates to vehicles and, more particularly, to multi-tiered body frame integral structures for off road vehicles.

The present disclosure describes an assembly that defines a structural load path that allows vehicular loads, such as cradle loads, control arm loads, shock loads, cradle mount loads, chassis-related loads, trailering, and stiffening loads, to go through box sections in A body structure and around structurally compromised areas in the load bearing rails and back into the cradle. This assembly enables manufacturing of a high travel suspension Body Frame Integral (BFI) truck with high mass due to a battery pack, wherein the shock tower provides high stiffness attachment and off-road durability while also enabling towing.

The present disclosure describes a structural load path assembly. The assembly includes an upper rail configured to be coupled to a suspension system, a lower rail spaced apart from the upper rail along a vertical direction, a first outer bracket interconnecting the upper rail and the lower rail, a second outer bracket interconnecting the upper rail and the lower rail, and a first inner bracket interconnecting the upper rail and the lower rail. The first inner bracket is spaced apart from the first outer bracket along a horizontal direction, and the horizontal direction is perpendicular to the vertical direction. The assembly further includes a second inner bracket interconnecting the upper rail and the lower rail. The second inner bracket is spaced apart from the second outer bracket along the horizontal direction. The assembly further includes a box section sized to receive a shock absorber. The first inner bracket is closer to the box section than the first outer bracket, and the second inner bracket is closer to the box section than the second outer bracket. The assembly defines a first lateral gap between the first outer bracket and the first inner bracket, and the first lateral gap is sized to receive a first leg of an upper control arm of the suspension system. The assembly defines a second lateral gap between the second outer bracket and the second inner bracket, and the second lateral gap is sized to receive a second leg of an upper control arm of the suspension system. The assembly may further include a trailer hitch and a load dispersion bracket directly coupled to the trailer hitch.

The load dispersion bracket is directly coupled to the lower rail, and the load dispersion bracket is directly coupled to the second outer bracket. The first outer bracket may be directly coupled to the upper rail. The first outer bracket may be directly coupled to the lower rail. The second outer bracket may be directly coupled to the upper rail. The second outer bracket may be directly coupled to the lower rail.

The first inner bracket may be directly coupled to the upper rail, the first inner bracket is directly coupled to the lower rail. The second inner bracket is directly coupled to the upper rail, and the second inner bracket is directly coupled to the lower rail.

The box section may include a first lateral wall and a second lateral wall opposite the first lateral wall. The first lateral wall may be closer to the first inner bracket than to the first outer bracket. The second lateral wall is closer to the second inner bracket than to the second outer bracket.

The assembly may further include a first tube coupled between the first lateral wall and the first inner bracket. The first tube is in direct contact with the first lateral wall. The first tube is in direct contact with the first inner bracket. The structural load path assembly includes a first fastener extending through the first tube. The assembly may further include a second tube coupled between the second lateral wall and the second inner bracket. The second tube is in direct contact with the second lateral wall and the second inner bracket, the second tube is in direct contact with the second lateral wall, the second tube is in direct contact with the second inner bracket, and the structural load path assembly includes a second fastener extending through the second tube.

The assembly may further include a floating locating body directly connected to the first inner bracket. The floating locating body defines a locating hole sized, shaped, and configured to receive the first fastener. The fastener is connected to the first leg of the upper control arm. The floating locating body has a tapered configuration.

The box section may include a top assembly directly coupled to the first inner bracket and the second inner bracket. The top assembly includes a main support body. The main support body has flat border and defines a body recess obliquely angled relative to the flat border. The main support body includes an angled wall obliquely angled relative to the flat border. The angled wall defines the body recess. The top assembly includes a cross member extending across the body recess. The top assembly includes an angular support disposed between the cross member and the angular wall. The angular support is in direct contact with the cross member and the angular wall.

The present disclosure also describes a vehicle including a suspension system. The suspension system includes an upper control arm. The upper control arm includes a first leg and a second leg spaced apart from the first leg. The vehicle further includes a structural load path assembly (as described above) coupled to the suspension system.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
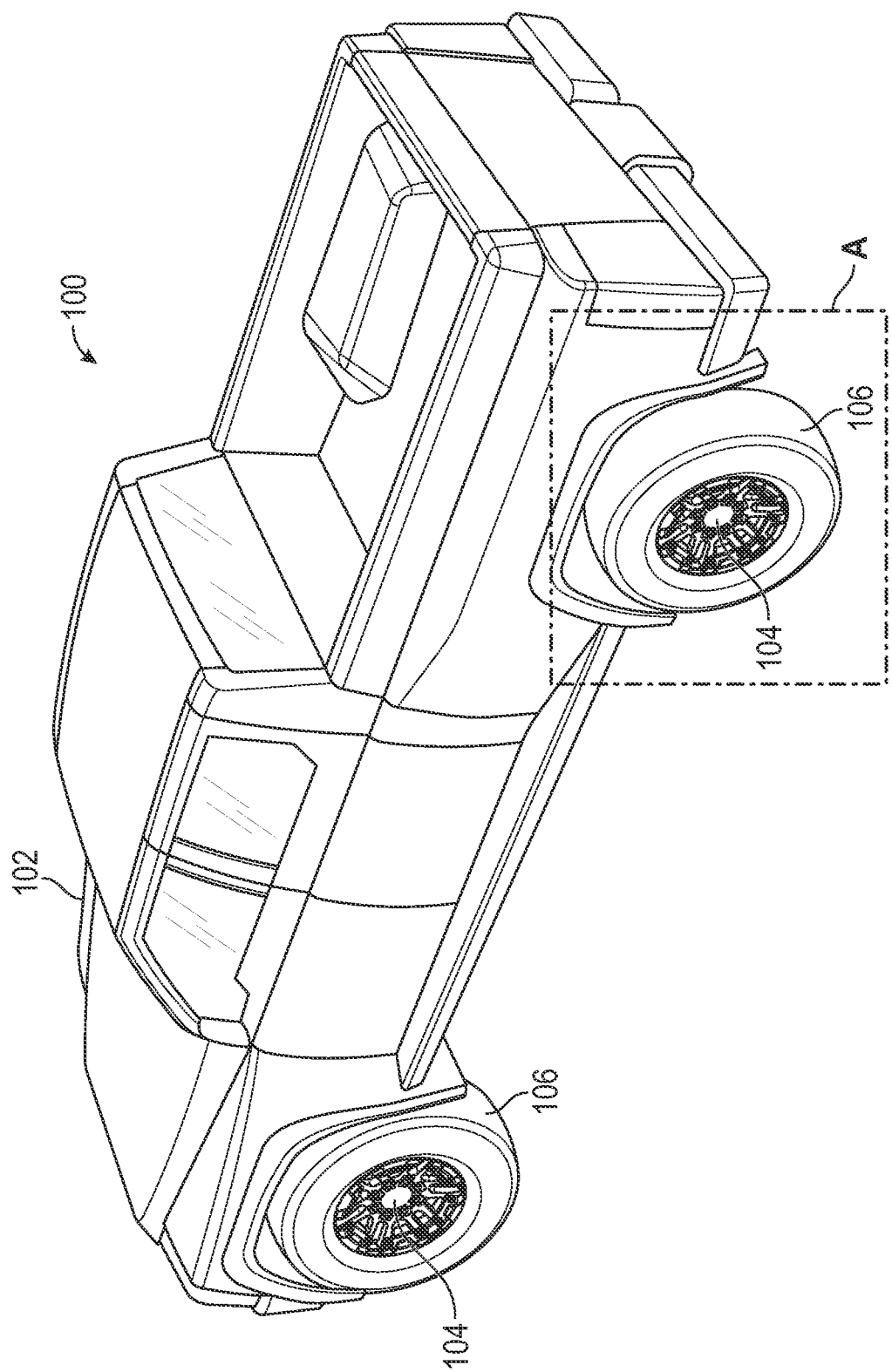
FIG. 1 is a schematic, isometric view of a vehicle.

FIG. 1 schematically illustrates an off-road vehicle 100, such as a pickup truck, including a vehicle body 102 and a plurality of wheels 104 attached to the vehicle body 102. The vehicle 100 further includes tires 106 attached to the wheels 104. While the vehicle 100 shown is configured as pickup truck, it is contemplated that the vehicle 100 may be configured as other kinds of off-road vehicles. The vehicle 100 is configured as a body frame integral (BFI) structure. The vehicle 100 may include a rechargeable energy storage system (RESS), such as a battery pack.

Figure 2:
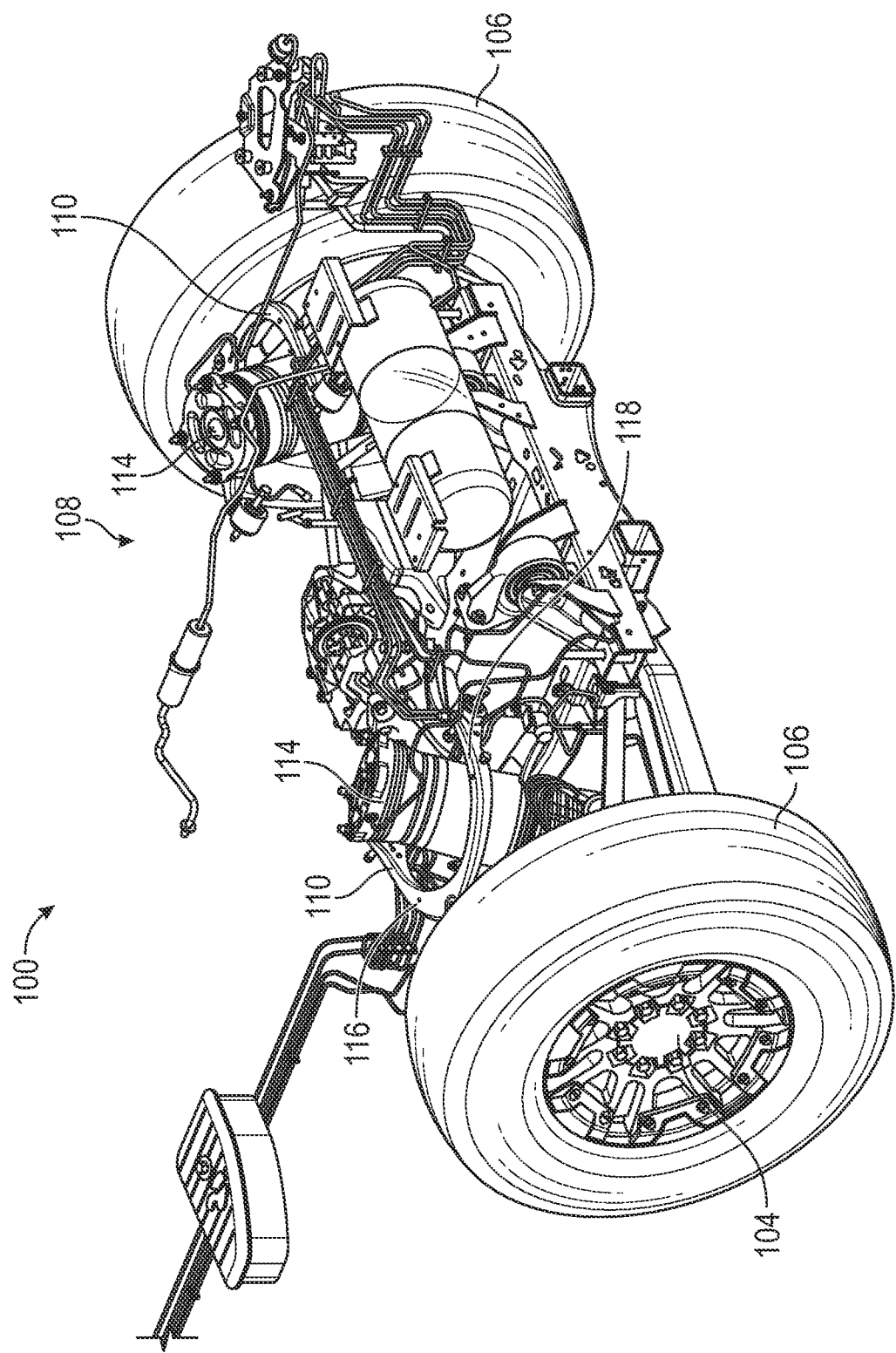
FIG. 2 is a schematic, isometric view of an inner parts of the vehicle of FIG. 1, taken around area A of FIG. 1 and showing a suspension mounted directly to a body of the vehicle of FIG. 1.

With reference to FIG. 2, the vehicle 100 includes a suspension system 108 coupled wheels 104. The suspension system 108 is configured to dampen the loads exerted on the vehicle 100. In the depicted embodiment, the suspension system 108 includes upper control arms 110, lower control arms (not shown), and shock absorbers 114. Each upper control arm 110 is coupled to one of the wheels 104, and each lower control arm 112 is coupled to one of the wheels 104. Each upper control arm 110 partially surrounds one of the shock absorbers 114. Each upper control arm 110 includes a first leg 116 and a second leg 118 spaced apart from each other. The first leg 116 and the second leg 118 of the control arm 110 are directly connected to each other at an arm joint 120. The arm joint 120 may be directly connected to a ball joint 122 (FIG. 3) for connecting to one of the wheels 104.

Figure 3:
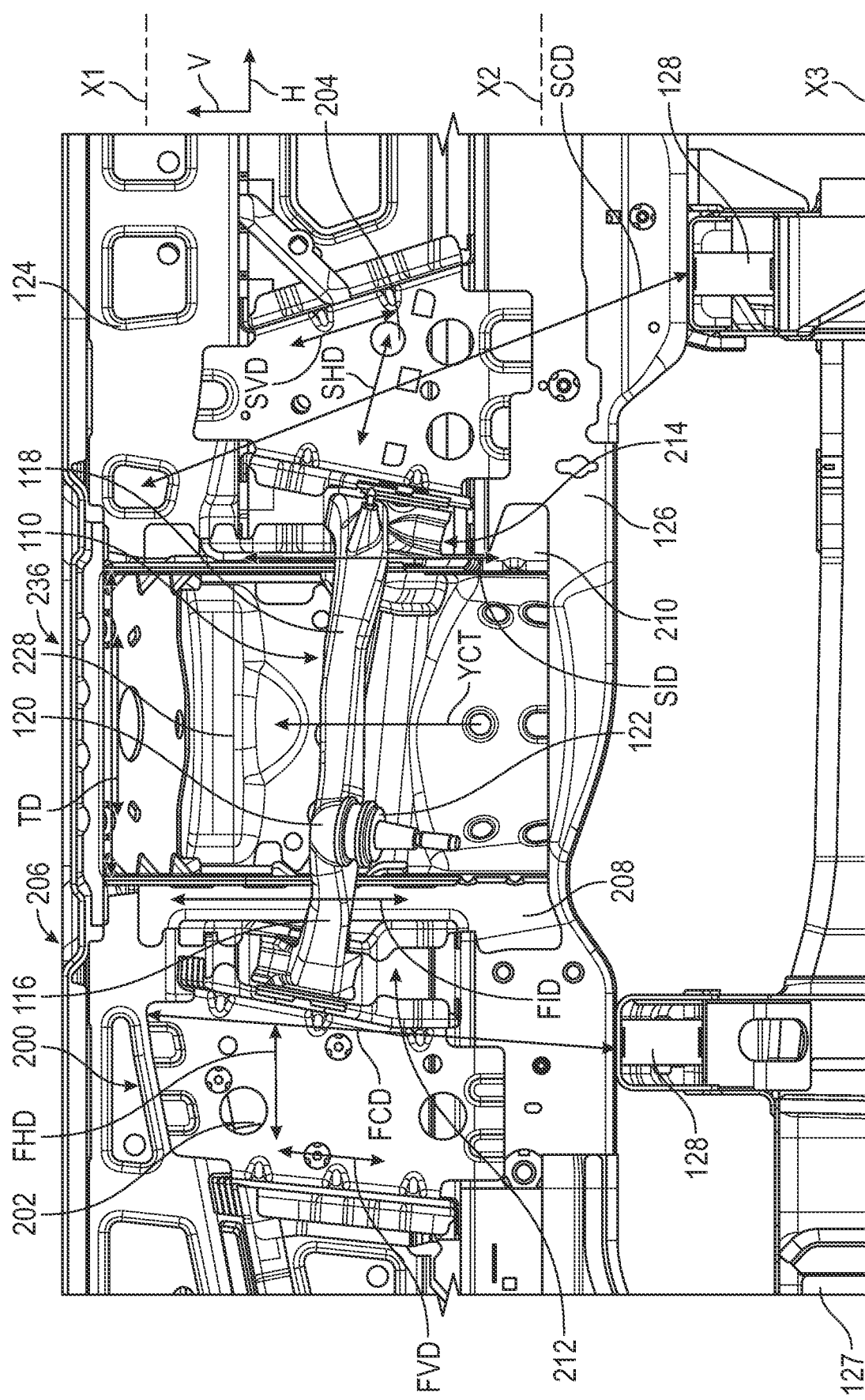
FIG. 3 is a schematic, side view of the vehicle of FIG. 1, showing part of the suspension system and a structural load path assembly.
Figure 4:
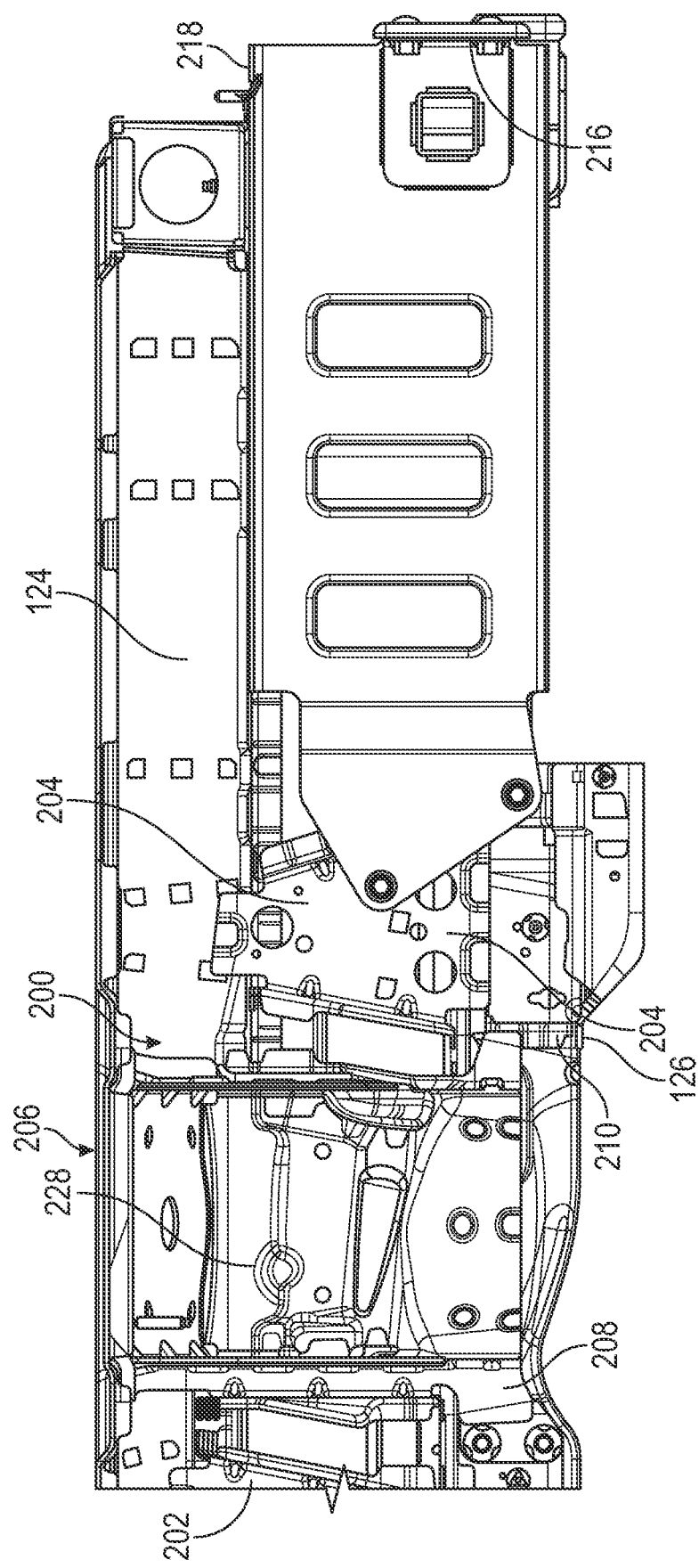
FIG. 4 is a schematic, side view of the vehicle of FIG. 1, showing part of the structure load path assembly.
Figure 5:
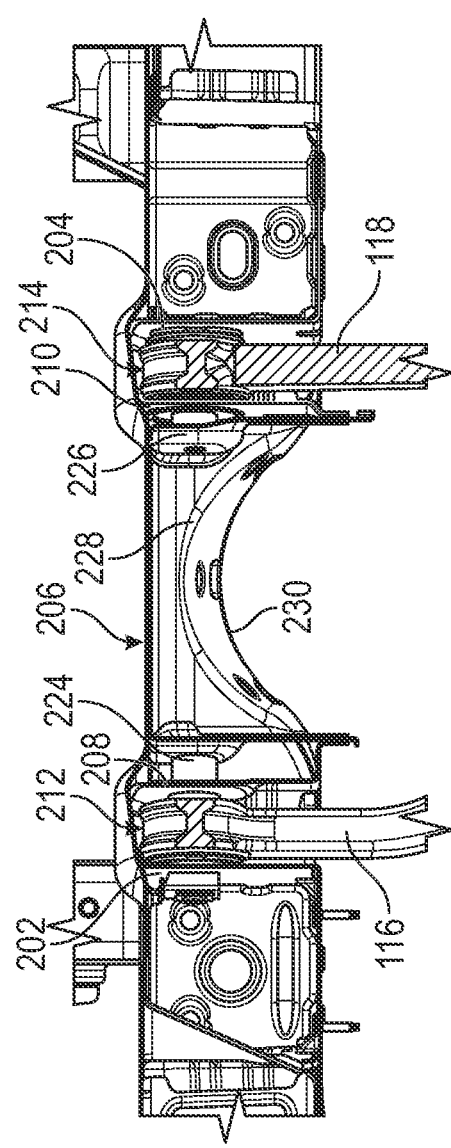
FIG. 5 is a schematic, top view of the vehicle of FIG. 1, showing part of the structure load path assembly and part of the upper control arm attached to the structural load path assembly.
Figure 6:
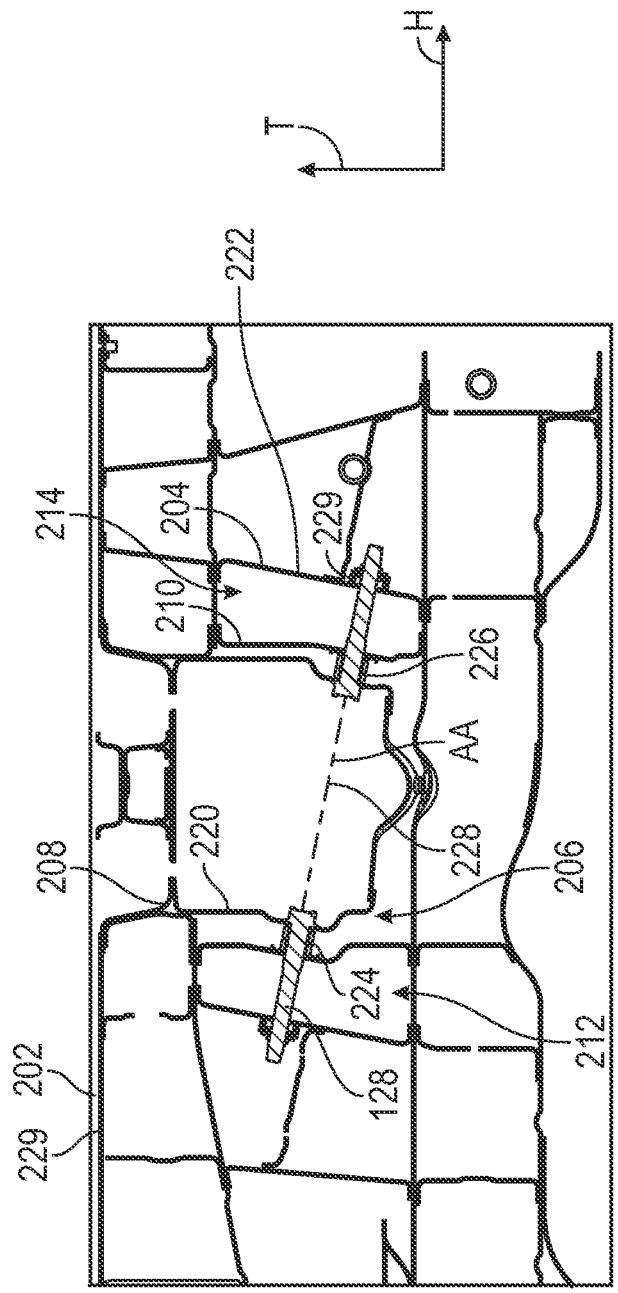
FIG. 6 is a schematic, top view of the vehicle of FIG. 1, showing part of the structure load path assembly without the upper control arm.

With reference to FIGS. 3 and 4, the vehicle 100 further includes an upper rail 124 and a lower rail 126. The upper rail 124 is elongated along a first longitudinal axis X1, and the second lower rail 126 is elongated along a second longitudinal axis X2. The first longitudinal axis X1 is parallel to the second longitudinal axis X2 to efficiently distribute the loads managed by the upper rail 124 and the second lower rail 126. Each of the upper rail 124 and the lower rail 126 is elongated along a horizontal direction H. The upper rail 124 is spaced apart from the lower rail 126 along a vertical direction V. The vertical direction V is perpendicular to the horizontal direction. The vehicle 100 further includes a cradle 127 elongated along a third longitudinal axis X3 and the horizontal direction H. The third longitudinal axis X3 is parallel to the first longitudinal axis X2 and the second longitudinal axis X2 to efficiently manage the loads experienced by the vehicle 100. The third longitudinal axis X3 is spaced apart from the first longitudinal axis X1 and the second longitudinal axis X2 along the vertical direction V. One or more fasteners 128, such as bolts, directly connect the lower rail 126 to the cradle 127 to enhance the structure integrity of the vehicle 100. As a result, loads can be efficiently transferred between the lower rail 128 and the cradle 127 of the vehicle 100.

The vehicle 100 further includes a structural load path assembly 200 directly coupled to the upper rail 124 and the second rail 126 to enable transfer of loads between: 1) the upper rail 124 and the lower rail and 2) the cradle 127, thereby enabling a high travel suspension of the vehicle 100 (i.e., the BFI structure) with high mass due to the RESS. The structural load path assembly 200 includes a first outer bracket 202 and a second outer bracket 204 spaced apart from each other along the horizontal direction H. Each of the first outer bracket 202 and the second outer bracket 204 is directly coupled to the upper rail 124 and directly coupled to the lower rail 126 allow load transfer between the upper rail 124 and the lower rail 126. To this end, each of the first outer bracket 202 and the second outer bracket 204 is elongated along the vertical direction. As a result, the first outer bracket 202 facilitates load transfer between the upper rail 124 and the lower rail 126 along in the direction indicated by double arrows FVD, and the second outer bracket 204 facilitates load transfer between the upper rail 124 and the lower rail 126 in the direction indicated by double arrows SVD. Moreover, each of the first outer bracket 202 and the second outer bracket 204 has a width along the horizontal direction H sufficient to allow load transfer along the horizontal direction H.

The first leg 116 of the upper control arm 110 is directly coupled to the first outer bracket 202 to facilitate load transfer between the first outer bracket 202 and the upper control arm 110 in the direction indicated by double arrows FHD. The second leg 118 of the control arm 110 is directly coupled to the second outer bracket 204 to facilitate load transfer between the upper control arm 110 and the second outer bracket 204 in the direction indicated by double arrows SHD. Further, because the lower rail 126 is connected to the cradle via fasteners 128, the first outer bracket 202 facilitates load transfer between the upper rail 124 and the cradle 127 in the direction indicated by double arrows FCD, and the second outer bracket 202 facilitates load transfer between the upper rail 124 and the cradle 127 in the direction indicated by double arrows SCD.

The structural load path assembly 200 further includes a box section 206 configured, shaped, and sized to enclose at least part of one of the shock absorbers 114. In addition, the structural load path assembly 200 includes a first inner bracket 208 and a second inner bracket 210 spaced apart from each other along the horizontal direction H. Each of the first inner bracket 208 and the second inner bracket 210 is elongated along the vertical direction V. Each of the first inner bracket 208 and the second inner bracket 210 is directly coupled to the upper rail 124 to facilitate load trans, and each of the first inner bracket 208 and the second inner bracket 210 is directly coupled to the lower rail 126 to facilitate load transfer between upper rail 124 and the lower rail 126 along the vertical direction V. Therefore, the first inner bracket 208 facilitates load transfer between the upper rail 124 and the lower rail 126 in the direction indicated by double arrows FID, and the second inner bracket 210 facilitates the upper rail 124 and the lower rail 126 in the direction indicated by double arrow SID. The first inner bracket 208 is closer to the box section 206 than the first outer bracket 202, and the second inner bracket 210 is closer to the box section 206 than the second outer bracket 204. The structural load path assembly 200 (as described above) creates an indirect load path around the primary load vector VCT during typical driving events, where the suspension system 108 drives inputs into the vehicle body 102. By creating the indirect load path, the load is circularly routed from the suspension system 108 back into the chassis structure, which includes the cradle 127. The box section 206 extends from the upper rail 124 to the lower rail 126 to route vertical loads between the upper rail 124 and the lower rail 126.

The structural load path assembly 200 defines a first lateral gap 212 between the first outer bracket 202 and the first inner bracket 208. The first lateral gap 212 is configured, sized, and shaped to tightly receive at least a portion of the first leg 116 of the upper control arm 110. Further, the structural load path assembly 200 defines a second lateral gap 214 between the second outer bracket 204 and the second inner bracket 210. The second lateral gap 214 is configured, shaped, and sized to tightly receive at least a portion of the second leg 118 of the upper control arm 110.

With reference to FIG. 4, the vehicle 100 includes a trailer hitch 216 and a load dispersion bracket 218 directly coupled to the trailer hitch 216 to enhance the structural integrity of the vehicle 100. The load dispersion bracket 218 is directly connected to the second outer bracket 204, the upper rail 124, and the lower rail 126. As a consequence, the trailer hitch 216 can be used as load dispersion mechanism in which the loads are transferred between the upper rail 124 and the lower rail 126. The load dispersion bracket 218 ties the upper rail 124 and the lower rail 126 together where there is not vertical connection at the rear of the upper rail 124 and the lower rail 126. This enables dispersion of the loads in the rear impact scenario between the upper and lower paths as well as enables the vehicle 100 to manage the towing and recovery hook loads. Using the load dispersion bracket 218 (which is directly coupled to the trailer hitch 216) effectively creates two load paths to disperse the load during recovery loads, tailing loads, and during rear impact crash events.

Referring to FIGS. 3-6, the box section 206 includes first lateral wall 220 and a second lateral wall 222 opposite the first lateral wall 220. A first tube 224 is disposed between (and in direct contact with) the first lateral wall 220 and the first inner bracket 208 to enhance the structural integrity of the box section 206. A second tube 226 is disposed between (and in direct contact with) the second lateral wall 222 and the second inner bracket 210. The box section 206 further includes a rear wall 228 directly connected to the first lateral wall 220 and the second lateral wall 222 to enhance the structural integrity of the box section 206. The rear wall 228 may include a curved recess 230 configured, shaped, and sized to accommodate one of the shock absorbers 114. The first lateral wall 220 is spaced from the second lateral wall 222 along the horizontal direction H.

With reference again to FIGS. 3-6, the first tube 224 is spaced apart from the second tube 226 along the horizontal direction H and a traverse direction T. The traverse direction T is perpendicular to the horizontal direction H. One fastener 128, such as a bolt, extends through the bushing 224, the first lateral gap 212, the first inner bracket 208, the first leg 116, and the first outer bracket 202 to connect the first leg 116 to the structural load path assembly 200. This fastener 128 is elongated along an alignment axis AA that is obliquely angled relative to the horizontal direction H. A nut 229 may be coupled to this fastener 128 and the first outer bracket 202 to secure the fastener 128 to the first outer bracket 202. Another fastener 128 is elongated along the alignment axis AA and extends through the second outer bracket 204, the second lateral gap 214, the second tube 226, the second leg 118, and the second inner bracket 210 to connect the second leg 118 to the structural load path assembly 200. The fasteners 128 (e.g., bolts) for attaching the first leg 116 and the second leg 118 of the upper control arm 110 are run from the inside of the box section 206 outboard to the first outer bracket 202 and the second outer bracket 204 to enable the largest fore-aft rail section possible. Another nut 229 may be coupled to this fastener 128 and the second outer bracket 204 to secure the fastener 128 to the second outer bracket 204. The connections described above facilitate assembly of the structural load path assembly 200 and apply the necessary clamp load the keep the components of the suspension system 108 in place during operation of the vehicle 100. The box section 206 not only provides the necessary load paths back to the chasses (which includes the cradle 127) but also provides the structure and mounting provisions for the components of the suspension system 108. This mounting provisions are angular to grid and provide both net and floating attachments to enable building strategy as well as include features to increase local stiffness. The attachments for the suspension system 108

Figure 7:
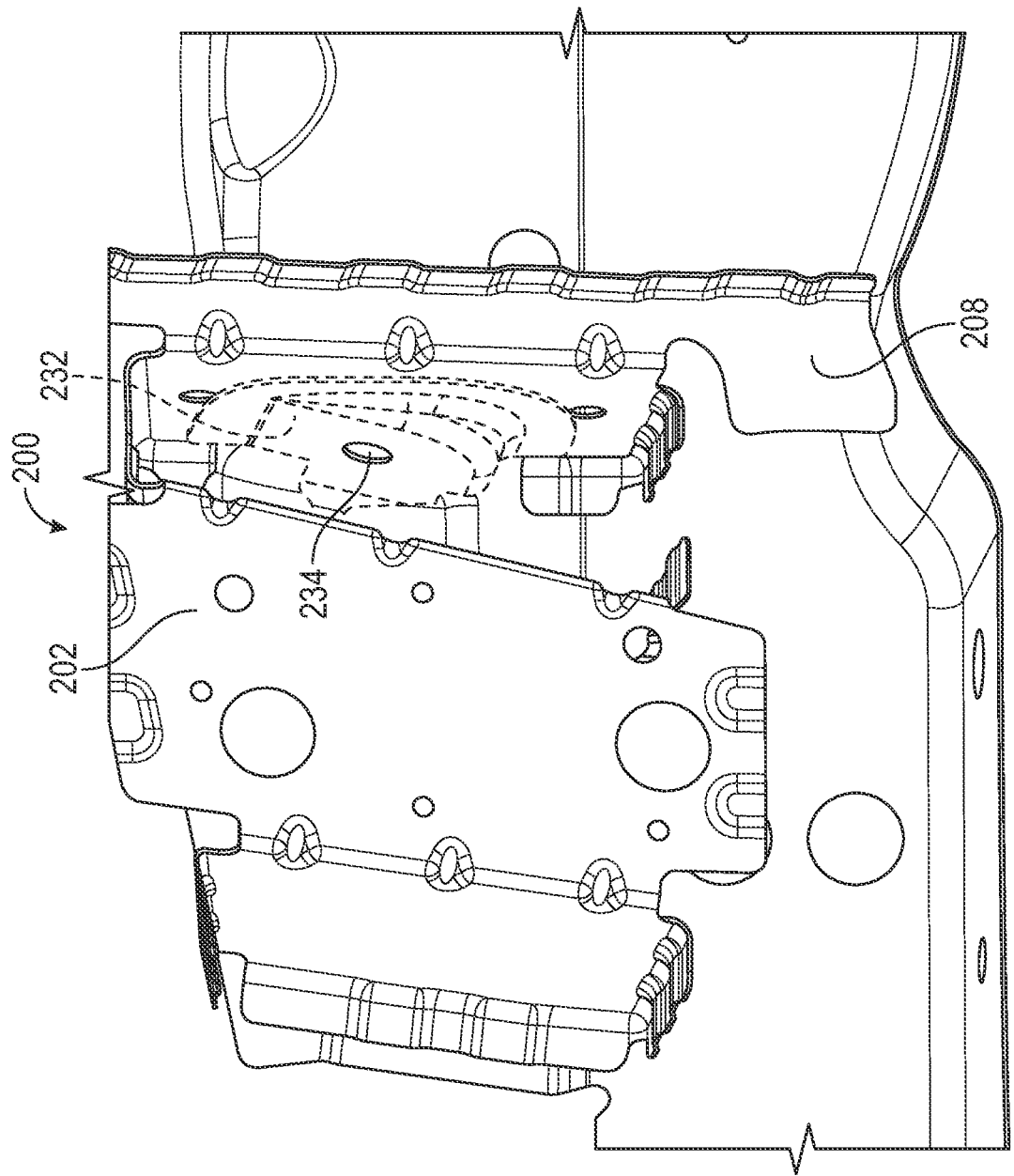
FIG. 7 is a schematic isometric, side view of part of the structural load path assembly of the vehicle of FIG. 1.

With reference to FIG. 7, the structural load path assembly 200 includes a floating locating body 232 directly connected to the first inner bracket 208. The floating locating body 232 defines a locating hole 234 sized, shaped, and configured to receive the fasteners 128 that is connected to the first leg 116. The floating locating body 232 has a tapered configuration to allow the bushing of the upper control arm 110 to be accurately located relative to the first inner bracket 208. The box section 206 may have a frog eye or a flat piece to help with ease of assembly and create a weld gun access. The floating locating body 232 allows for the bushing of the upper control arm 110 to be positioned as late as possible in the assembly process, which reduces the variation for the locating hole 234 and enables a more dimensionally stable building process.

Figure 8:
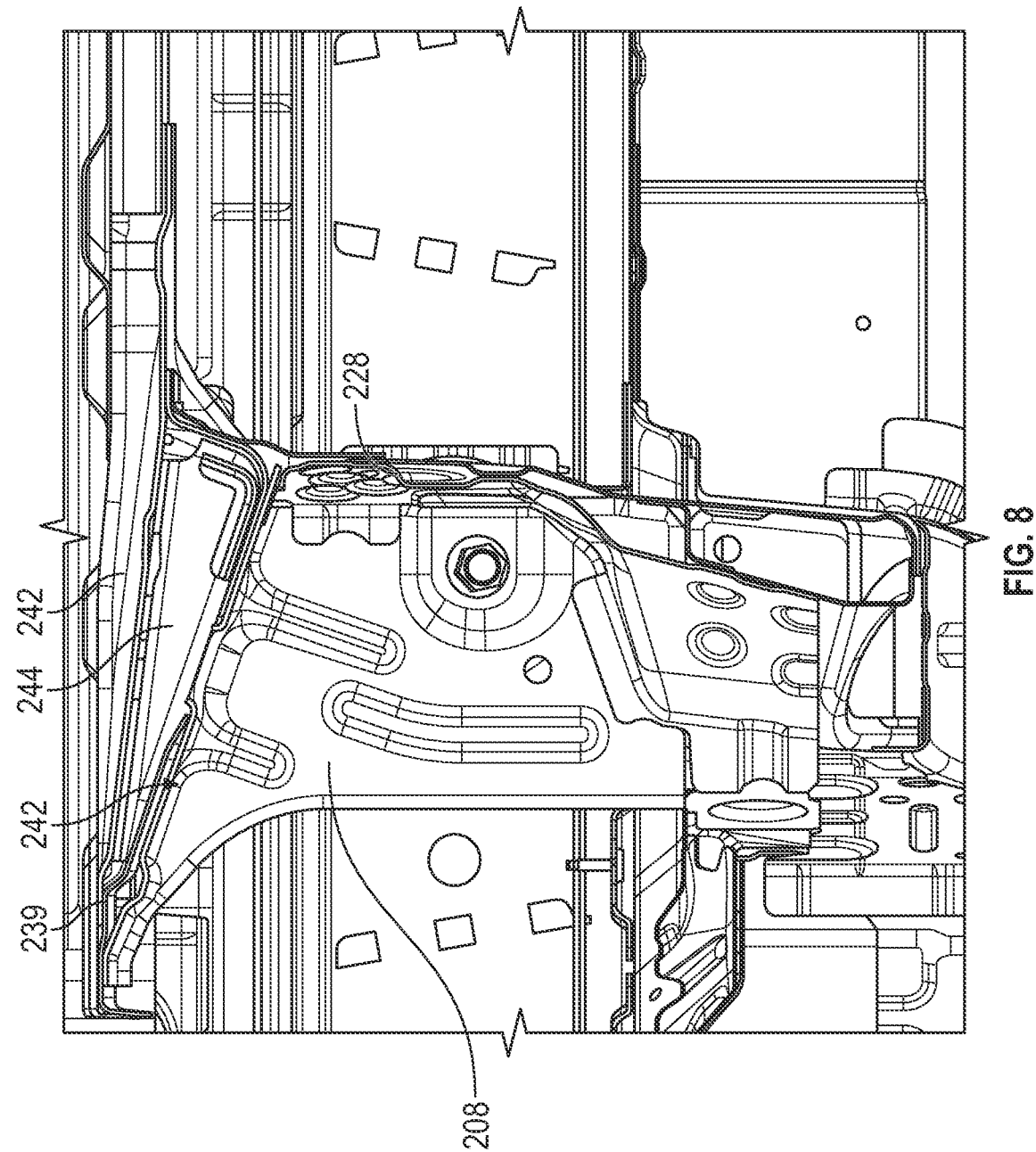
FIG. 8 is a schematic, rear view of the part of the structural load path assembly of the vehicle of FIG. 1.
Figure 9:
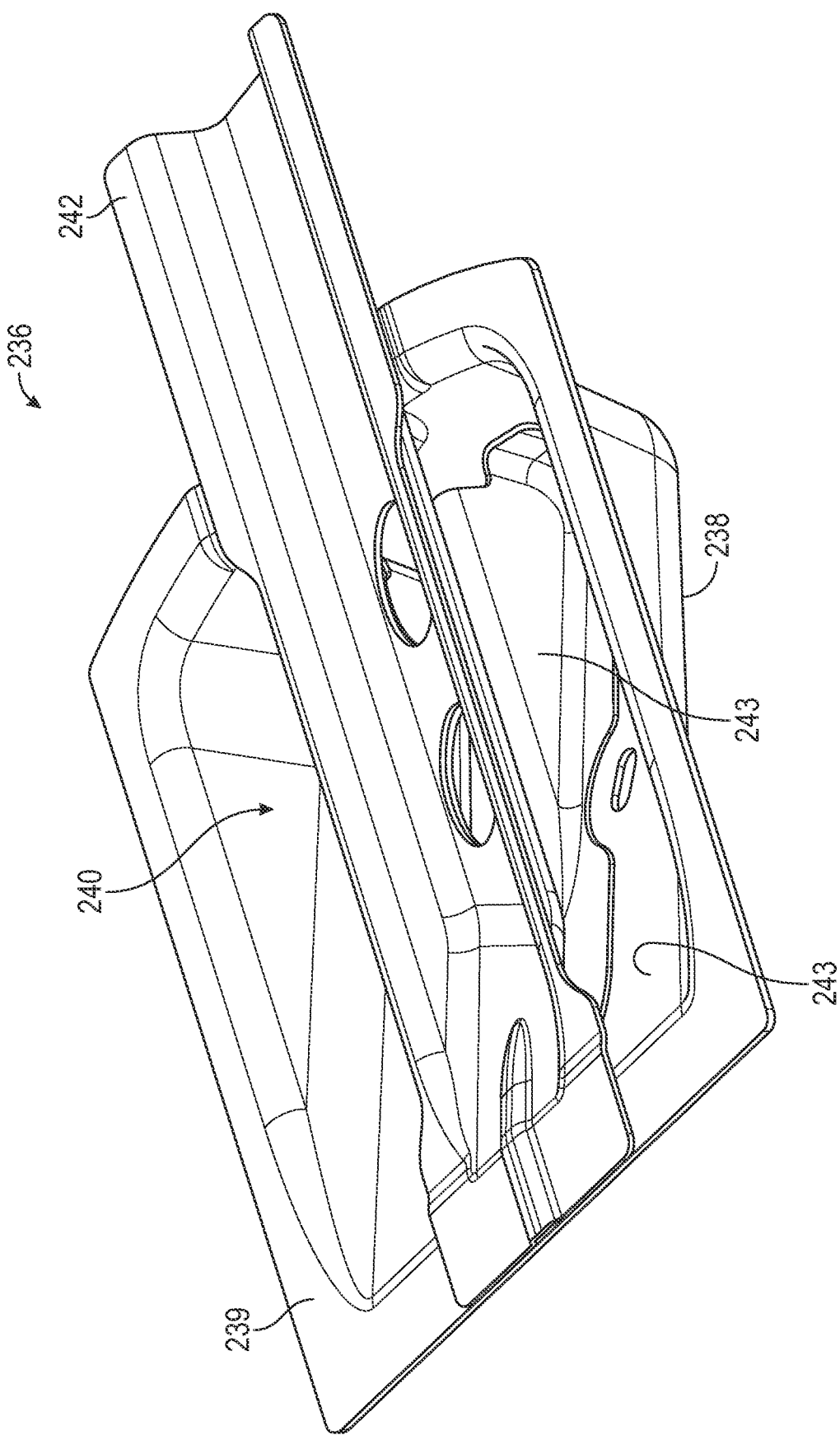
FIG. 9 is a schematic, isometric top view of the part of the structural load path assembly of the vehicle of FIG. 1.

With reference to FIGS. 3, 8, and 9, the box section 206 includes a top assembly 236 directly coupled to the first inner bracket 208 and the second inner bracket 210 to enhance the structural integrity of the box section 206, thereby allowing load transfer along the horizontal direction H in the direction indicated by double arrows TD. The top assembly 236 provides additional local stiffness with and without processing features for the components of the suspension system 108 and allows for the load to be transferred between all sections that connect the upper rail 124 and lower rail 126. The top assembly 236 includes a main support body 238 that is configured as a tray. The main support body 238 has flat border 239 and defines a body recess 240 obliquely angled relative to the flat border 239. The main support body 238 includes an angled wall 243 obliquely angled relative to the flat border 239. The angled wall 243 defines the body recess 240. The top assembly 236 includes a cross member 242 extending across the body recess 240. In addition, the top assembly 236 includes an angular support 244 disposed between the cross member 242 and the angular wall 242. The angular support 244 is in direct contact with the cross member 242 and the angular wall 242 to carry loads along the top assembly 236. The cross member 242 enhances the local stiffness relative to the outer edge of the vehicle 100 through the top of the upper rail 124. The cross member 242 may be on-piece structure that connects both sides of the vehicle 100 or may a multi-piece structure that enables ease of assembly for manufacturing. In addition, the cross member 242 reaches from the left side to right side of the vehicle 100 for stiffness management.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A structural load path assembly, comprising
an upper rail configured to be coupled to a suspension system;
a lower rail spaced apart from the upper rail along a vertical direction;
a first outer bracket interconnecting the upper rail and the lower rail;
a second outer bracket interconnecting the upper rail and the lower rail;
a first inner bracket interconnecting the upper rail and the lower rail, wherein the first inner bracket is spaced apart from the first outer bracket along a horizontal direction, and the horizontal direction is perpendicular to the vertical direction;
a second inner bracket interconnecting the upper rail and the lower rail, wherein the second inner bracket is spaced apart from the second outer bracket along the horizontal direction;
a box section sized to receive a shock absorber, wherein the first inner bracket is closer to the box section than the first outer bracket, and the second inner bracket is closer to the box section than the second outer bracket;
a trailer hitch and a load dispersion bracket directly coupled to the trailer hitch, wherein the load dispersion bracket is directly coupled to the lower rail, and the load dispersion bracket is directly coupled to the second outer bracket;
wherein the structural load path assembly defines a first lateral gap between the first outer bracket and the first inner bracket, and the first lateral gap is sized to receive a first leg of an upper control arm of the suspension system;
wherein the structural load path assembly defines a second lateral gap between the second outer bracket and the second inner bracket, and the second lateral gap is sized to receive a second leg of an upper control arm of the suspension system;
wherein the first outer bracket is directly coupled to the upper rail, the first outer bracket is directly coupled to the lower rail, the second outer bracket is directly coupled to the upper rail, and the second outer bracket is directly coupled to the lower rail;
wherein the first inner bracket is directly coupled to the upper rail, the first inner bracket is directly coupled to the lower rail, the second inner bracket is directly coupled to the upper rail, and the second inner bracket is directly coupled to the lower rail;
wherein the box section includes a first lateral wall and a second lateral wall opposite the first lateral wall, the first lateral wall is closer to the first inner bracket than to the first outer bracket, the second lateral wall is closer to the second inner bracket than to the second outer bracket; and
wherein the structural load path assembly further comprises a first tube coupled between the first lateral wall and the first inner bracket, wherein the first tube is in direct contact with the first lateral wall, the first tube is in direct contact with the first inner bracket, and the structural load path assembly includes a first fastener extending through the first tube.

2. The structural load path assembly of claim 1, further comprising a second tube coupled between the second lateral wall and the second inner bracket, wherein the second tube is in direct contact between the second lateral wall and the second inner bracket, the second tube is in direct contact with the second lateral wall, the second tube is in direct contact with the second inner bracket, and the structural load path assembly includes a second fastener extending through the second tube.

3. The structural load path assembly of claim 2, further comprising a floating locating body directly connected to the first inner bracket, the floating locating body defines a locating hole sized, shaped, and configured to receive the first fastener, the first fastener is connected to the first leg of the upper control arm, the floating locating body has a tapered configuration.

4. The structural load path assembly of claim 3, wherein the box section includes a top assembly directly coupled to the first inner bracket and the second inner bracket.

5. The structural load path assembly of claim 4, wherein the top assembly includes a main support body, the main support body has flat border and defines a body recess obliquely angled relative to the flat border, the main support body includes an angled wall obliquely angled relative to the flat border, the angled wall defines the body recess, the top assembly includes a cross member extending across the body recess, the top assembly includes an angular support disposed between the cross member and the angled wall, and the angular support is in direct contact with the cross member and the angled wall.

6. A vehicle, comprising:
a suspension system including an upper control arm, wherein the upper control arm includes a first leg and a second leg spaced apart from the first leg; and
a structural load path assembly coupled to the suspension system, wherein the structural load path assembly includes:
an upper rail configured to be coupled to a suspension system;
a lower rail spaced apart from the upper rail along a vertical direction;

a first outer bracket interconnecting the upper rail and the lower rail;

a second outer bracket interconnecting the upper rail and the lower rail;

a first inner bracket interconnecting the upper rail and the lower rail, wherein the first inner bracket is spaced apart from the first outer bracket along a horizontal direction, and the horizontal direction is perpendicular to the vertical direction;

a second inner bracket interconnecting the upper rail and the lower rail, wherein the second inner bracket is spaced apart from the second outer bracket along the horizontal direction;

a box section sized to receive a shock absorber, wherein the first inner bracket is closer to the box section than the first outer bracket, and the second inner bracket is closer to the box section than the second outer bracket;

a trailer hitch and a load dispersion bracket directly coupled to the trailer hitch, wherein the load dispersion bracket is directly coupled to the lower rail, and the load dispersion bracket is directly coupled to the second outer bracket;

wherein the structural load path assembly defines a first lateral gap between the first outer bracket and the first inner bracket, and the first lateral gap is sized to receive a first leg of an upper control arm of the suspension system;

wherein the structural load path assembly defines a second lateral gap between the second outer bracket and the second inner bracket, and the second lateral gap is sized to receive a second leg of an upper control arm of the suspension system;

wherein the first outer bracket is directly coupled to the upper rail, the first outer bracket is directly coupled to the lower rail, the second outer bracket is directly coupled to the upper rail, and the second outer bracket is directly coupled to the lower rail;

wherein the first inner bracket is directly coupled to the upper rail, the first inner bracket is directly coupled to the lower rail, the second inner bracket is directly coupled to the upper rail, and the second inner bracket is directly coupled to the lower rail;

wherein the box section includes a first lateral wall and a second lateral wall opposite the first lateral wall, the first lateral wall is closer to the first inner bracket than to the first outer bracket, the second lateral wall is closer to the second inner bracket than to the second outer bracket; and wherein the vehicle further includes a first tube coupled between the first lateral wall and the first inner bracket, wherein the first tube is in direct contact with the first lateral wall, the first tube is in direct contact with the first inner bracket, and the structural load path assembly includes a first fastener extending through the first tube.

7. The vehicle of claim 6, further comprising a second tube coupled between the second lateral wall and the second inner bracket, wherein the second tube is in direct contact between the second lateral wall and the second inner bracket, the second tube is in direct contact with the second lateral wall, the second tube is in direct contact with the second inner bracket, and the structural load path assembly includes a second fastener extending through the second tube.

8. The vehicle of claim 7, further comprising a floating locating body directly connected to the first inner bracket, the floating locating body defines a locating hole sized, shaped, and configured to receive the first fastener, the first fastener is connected to the first leg of the upper control arm, the floating locating body has a tapered configuration.

9. The vehicle of claim 8, wherein the box section includes a top assembly directly coupled to the first inner bracket and the second inner bracket.

10. The vehicle of claim 9, wherein the top assembly includes a main support body, the main support body has flat border and defines a body recess obliquely angled relative to the flat border, the main support body includes an angled wall obliquely angled relative to the flat border, the angled wall defines the body recess, the top assembly includes a cross member extending across the body recess, the top assembly includes an angular support disposed between the cross member and the angled wall, and the angular support is in direct contact with the cross member and the angled wall.

* * * * *